(12) United States Patent
Eminoglu et al.

(10) Patent No.: US 11,077,527 B2
(45) Date of Patent: Aug. 3, 2021

(54) MODIFIED COMPONENTS AND METHODS FOR MODIFYING COMPONENTS

(71) Applicant: General Electric Company, Schenectady, NY (US)

(72) Inventors: Cem Murat Eminoglu, Simpsonville, SC (US); Cody Jermaine Ford, Simpsonville, SC (US); Brad Wilson Vantassel, Easley, SC (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 15/776,082

(22) PCT Filed: Dec. 20, 2016

(86) PCT No.: PCT/US2016/067645
§ 371 (c)(1),
(2) Date: May 15, 2018

(87) PCT Pub. No.: WO2017/112610
PCT Pub. Date: Jun. 29, 2017

(65) Prior Publication Data
US 2018/0326546 A1    Nov. 15, 2018

Related U.S. Application Data

(60) Provisional application No. 62/270,195, filed on Dec. 21, 2015.

(51) Int. Cl.
*B23P 6/04* (2006.01)
*F01D 5/00* (2006.01)
*B23P 6/00* (2006.01)

(52) U.S. Cl.
CPC .............. *B23P 6/045* (2013.01); *B23P 6/002* (2013.01); *F01D 5/005* (2013.01);
(Continued)

(58) Field of Classification Search
CPC ........... B23P 15/04; B23P 6/005; B23P 6/045; B23P 6/007; B23P 6/002; F05D 2240/122; F01D 5/005
See application file for complete search history.

(56) References Cited

U.S. PATENT DOCUMENTS 4,810,467 A    3/1989  Wood et al.
5,154,884 A   10/1992  Wukusick et al.
(Continued)

FOREIGN PATENT DOCUMENTS

CN    1857847 A     11/2006
CN    102039494 A    5/2011
(Continued)

OTHER PUBLICATIONS

Espacenet, English machine translation of DE 19963714 (Year: 2001).*

(Continued)

*Primary Examiner* — Courtney D Heinle
*Assistant Examiner* — Andrew Thanh Bui
(74) *Attorney, Agent, or Firm* — Hoffman Warnick LLC (57) ABSTRACT

A component has an edge extending in a first direction. The component includes a filler disposed in the component. The filler has at least a first portion and a second portion. The first portion extends in a second direction from the edge into the component. The second portion of the filler extends from the first portion in a third direction. The second direction is substantially orthogonal to the first direction.

19 Claims, 9 Drawing Sheets

(52) U.S. Cl.
CPC .... *F05D 2230/13* (2013.01); *F05D 2230/237* (2013.01); *F05D 2230/80* (2013.01); *F05D 2240/121* (2013.01); *F05D 2240/128* (2013.01); *F05D 2240/303* (2013.01)

(56) References Cited

U.S. PATENT DOCUMENTS

| | | | |
|---|---|---|---|
| 5,399,313 | A | 3/1995 | Ross et al. |
| 6,074,602 | A | 6/2000 | Wukusick et al. |
| 6,084,196 | A | 7/2000 | Flowers et al. |
| 6,416,596 | B1 | 7/2002 | Wood et al. |
| 6,428,637 | B1 | 8/2002 | Wood et al. |
| 6,575,702 | B2 * | 6/2003 | Jackson ............ B23P 6/005 29/402.13 |
| 7,160,084 | B2 * | 1/2007 | Ahmad ............ F01D 5/143 416/231 B |
| 7,416,394 | B2 * | 8/2008 | Ahmad ............ F01D 5/147 416/231 B |
| 8,881,965 | B2 * | 11/2014 | Stankowski ...... B23K 1/0018 228/119 |
| 9,416,667 | B2 * | 8/2016 | Cui ................. F01D 5/188 |
| 2003/0082048 | A1 | 5/2003 | Jackson et al. |
| 2011/0264413 | A1 | 10/2011 | Stankowski et al. |

FOREIGN PATENT DOCUMENTS

| | | |
|---|---|---|
| CN | 103415365 A | 11/2013 |
| CN | 104923956 A | 9/2015 |
| CN | 105149597 A | 12/2015 |
| DE | 199 63 714 A1 | 7/2001 |
| EP | 2 902 516 A1 | 8/2015 |
| JP | S60259706 A | 12/1985 |
| JP | 2002303155 A | 10/2002 |
| JP | 2003342617 A | 12/2003 |
| JP | 2009041449 A | 2/2009 |
| JP | 2015533987 A | 11/2015 |
| WO | 2003048528 A1 | 6/2003 |

OTHER PUBLICATIONS

International Search Report and Written Opinion issued in connection with corresponding PCT Application No. PCT/US2016/067645 dated Mar. 10, 2017.

Japanese Office Action for corresponding JP Application No. 2018-531568 dated May 31, 2021, 7 pages. English Translation Included.

* cited by examiner

MODIFIED COMPONENTS AND METHODS FOR MODIFYING COMPONENTS

BACKGROUND OF THE INVENTION

The subject matter disclosed herein relates to components and, more specifically, to modified components and methods for modifying components such as those used in turbomachines.

At least some known turbomachines, such as gas turbines, include components, such as, but not limited to, turbine nozzles, rotor blade airfoils, and/or shrouds, that may be exposed to mechanical stresses during operation. At least some of such components may incur damage, for example, a crack may form within the substrate when subjected to tension loading thus reducing the service life of the components. Repair of some such components requires removing the damaged area from the substrate via machining. The removed area is replaced by an insert or coupon that is welded into the cavity created by the removal of the damaged area. In at least some components, the weld between the insert and the substrate may carry the entire tension loading on the component while the rotary machine is in operation, thereby relying on a high quality of the weld for the insert to function. However, at least some components are formed from a substrate material, such as a high gamma prime superalloy, for which it is difficult to achieve a high-quality weld. Additionally or alternatively, at least some known repair methods require brazing the replacement insert onto the component substrate. However, at least some brazes do not perform well under tension loading.

Accordingly, alternative modified components and methods for modifying components would be welcome in the art.

BRIEF DESCRIPTION OF THE INVENTION

In one embodiment, a component is disclosed. The component can include an edge extending in a first direction. The component can also comprise a filler disposed in the component comprising at least a first portion and a second portion, wherein the first portion of the filler extends from the edge into the component in a second direction, and wherein the second portion of the filler extends from the first portion in a third direction.

In some of these embodiments, the second direction is substantially orthogonal to the first direction.

In some of these embodiments, the third direction is substantially parallel to the first direction.

In some of these embodiments, the component experiences a tensile stress in a tensile stress direction similar to the first direction.

In some of these embodiments, the component experiences a tensile stress in a tensile stress direction substantially parallel to the first direction. In even some of these embodiments, the second direction is substantially orthogonal to the tensile stress direction.

In some of these embodiments, the filler comprises a coupon. In even some of these embodiments the coupon comprises a plurality of separate pieces. In even some of these embodiments, the plurality of separate pieces is brazed together to form the coupon in the component.

In some of these embodiments, the filler comprises a braze.

In some of these embodiments, the filler comprises a weld.

In some of these embodiments, the filler forms a hermetic seal with the component.

In some of these embodiments, the filler comprises GTD 262 or GTD 263.

In some of these embodiments, the component comprises a nickel, cobalt or iron based super alloy.

In some of these embodiments, the component comprises Rene 108.

In some of these embodiments, the component comprises a hard-to-weld alloy.

In some of these embodiments, the component comprises a turbomachine component. In even some of these embodiments, the turbomachine component comprises a nozzle. In even some of these embodiments, the edge comprises a leading edge of the nozzle.

In another embodiment, a method for modifying a component is disclosed. The method may comprise forming a relief cut in the component, the relief cut comprising a first section and a second section, wherein the first section of the relief cut extends from the edge into the component in a second direction, and wherein the second section of the relief cut extends from the first section in a third direction. The method may further comprise filling in the relief cut with a filler.

In some of these embodiments, the relief cut is formed via plunge EDM.

In some of these embodiments, the relief cut is formed via laser.

In some of these embodiments, the relief cut is formed via water jet.

In some of these embodiments, the relief cut is formed via cutting.

In some of these embodiments, the second direction is substantially orthogonal to the first direction.

In some of these embodiments, the third direction is substantially parallel to the first direction.

In some of these embodiments, the component experiences a tensile stress in a tensile stress direction similar to the first direction.

In some of these embodiments, the component experiences a tensile stress in a tensile stress direction substantially parallel to the first direction. In even some of these embodiments, the second direction is substantially orthogonal to the tensile stress direction.

In some of these embodiments, the filler comprises a coupon. In even some of these embodiments, the coupon comprises a plurality of separate pieces. In even some of these embodiments, the plurality of separate pieces is brazed together to form the coupon in the component.

In some of these embodiments, the filler comprises a braze.

In some of these embodiments, the filler comprises a weld.

In some of these embodiments, the filler forms a hermetic seal with the component.

In some of these embodiments, the filler comprises GTD 262 or GTD 263.

In some of these embodiments, the component comprises a nickel, cobalt or iron based super alloy.

In some of these embodiments, the component comprises Rene 108.

In some of these embodiments, the component comprises a hard-to-weld alloy.

In some of these embodiments, the component comprises a turbomachine component. In even some of these embodiments, the turbomachine component comprises a nozzle. In even some of these embodiments, the edge comprises a leading edge of the nozzle.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Modified components disclosed herein can generally comprise a relief cut utilized to redirect stress away from a particular area (e.g., an area comprising one or more cracks). The relief cut may then be filled in at least to hermetically reseal the modified component to prevent air ingestion. By utilizing the relief cut in the modified component to redirect stresses, damaged or cracked areas may still be left in the component while still ensuring the integrity of the modified component and while also accounting for weld restraints for some hard to weld alloys. These and other embodiments and features will be disclosed herein with particular reference to turbomachine components, but it should be appreciated that other components may similarly incorporate these strategies.

Figure 1:
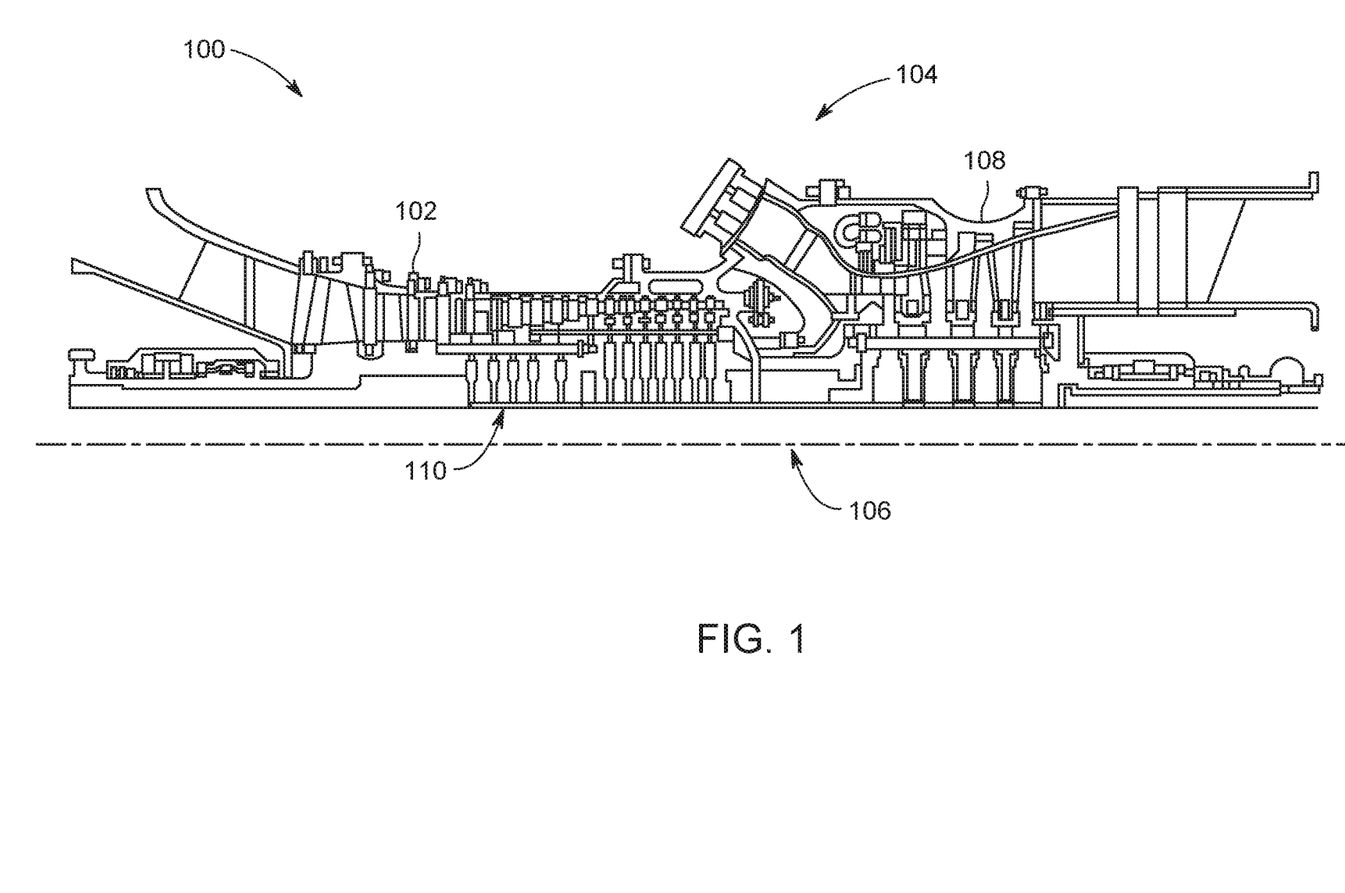
FIG. 1 is a turbomachine according to one or more embodiments shown or described herein.

FIG. 1 is a schematic view of a turbomachine 100, e.g., a turbomachine. In the exemplary embodiment, turbomachine 100 is a gas turbine engine. Turbomachine machine 100 includes a compressor assembly 102. A combustor assembly 104 is coupled downstream from, and in flow communication with, compressor assembly 102, and a turbine assembly 106 is coupled downstream from, and in flow communication with, combustor assembly 104. Turbine assembly 106 is coupled to compressor assembly 102 via a rotor assembly 108. In operation, compressor assembly 102 compresses inlet air to higher pressures and temperatures prior to discharging compressed air towards combustor assembly 104. The compressed air is mixed with fuel and burned within combustor assembly 104 to generate combustion gases that are channeled downstream toward turbine assembly 106. As the combustion gases impinge turbine assembly 106, thermal energy is converted to mechanical rotational energy that is used to drive rotor assembly 108. Rotor assembly 108 rotates about rotary machine axis 110.

Figure 2:
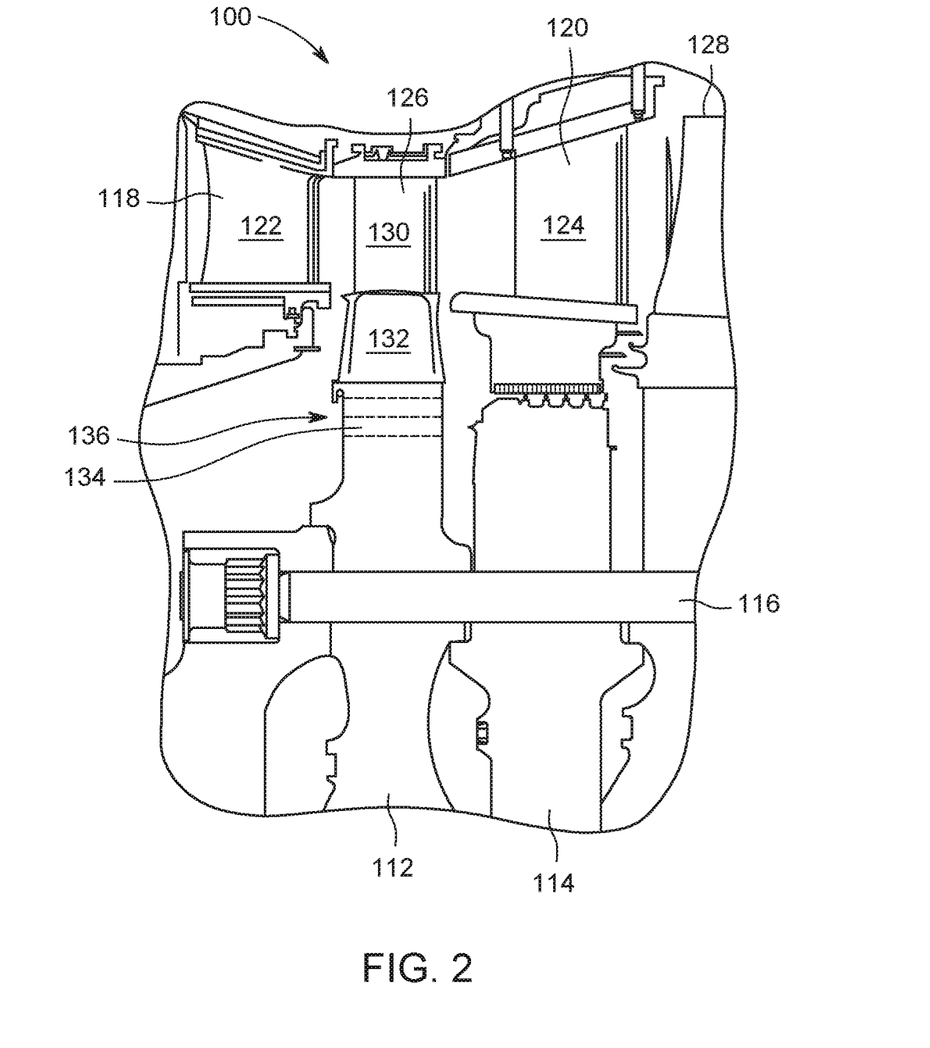
FIG. 2 is a side sectional view of a portion of a turbine assembly that may be used with a turbomachine according to one or more embodiments shown or described herein.

FIG. 2 is a side sectional view of a portion of an exemplary turbine assembly 106 of turbomachine 100. In the exemplary embodiment, turbine assembly 106 includes axially-spaced apart rotor disks 112 and spacer 114 that are coupled to each other, for example, by a plurality of circumferentially-spaced, axially-extending bolts 116. Although bolts 116 are shown for use in coupling disks 112 to spacers 114, any other suitable coupling structures may be used that enables rotary machine 100 to operate as described herein. Turbomachine 100 includes a plurality of first-stage nozzles 118 and a plurality of second-stage nozzles 120. Each plurality of nozzles 118 and 120 includes a plurality of circumferentially-spaced stator vanes, such as first and second stage stator vanes 122 and 124, respectively. A plurality of first-stage rotor blades 126 are coupled via disk 112 to rotor assembly 108 (shown in FIG. 1) for rotation between nozzles 118 and 120. Similarly, a plurality of second-stage rotor blades 128 are coupled to rotor assembly 108 for rotation between second-stage nozzles 120 and a third stage of nozzles (not shown). Although two stages of rotor blades and two stages of nozzles are illustrated, it should be understood that turbine assembly 106 includes any suitable number of stages that enables turbomachine 100 to function as described herein.

In the exemplary embodiment, each rotor blade 126 includes an airfoil 130. Additionally, each rotor blade 126 includes a dovetail 134 coupled to rotor disk 112. Dovetail 134 is inserted axially within a suitably-shaped slot 136 defined in rotor disk 112. During operation, a flow of hot combustion gases is channeled through a rotor/stator cavity exposing airfoil 130 to flow causing rotation of disk 112 and subjecting rotor blades 126 to centrifugal forces.

Figure 3:
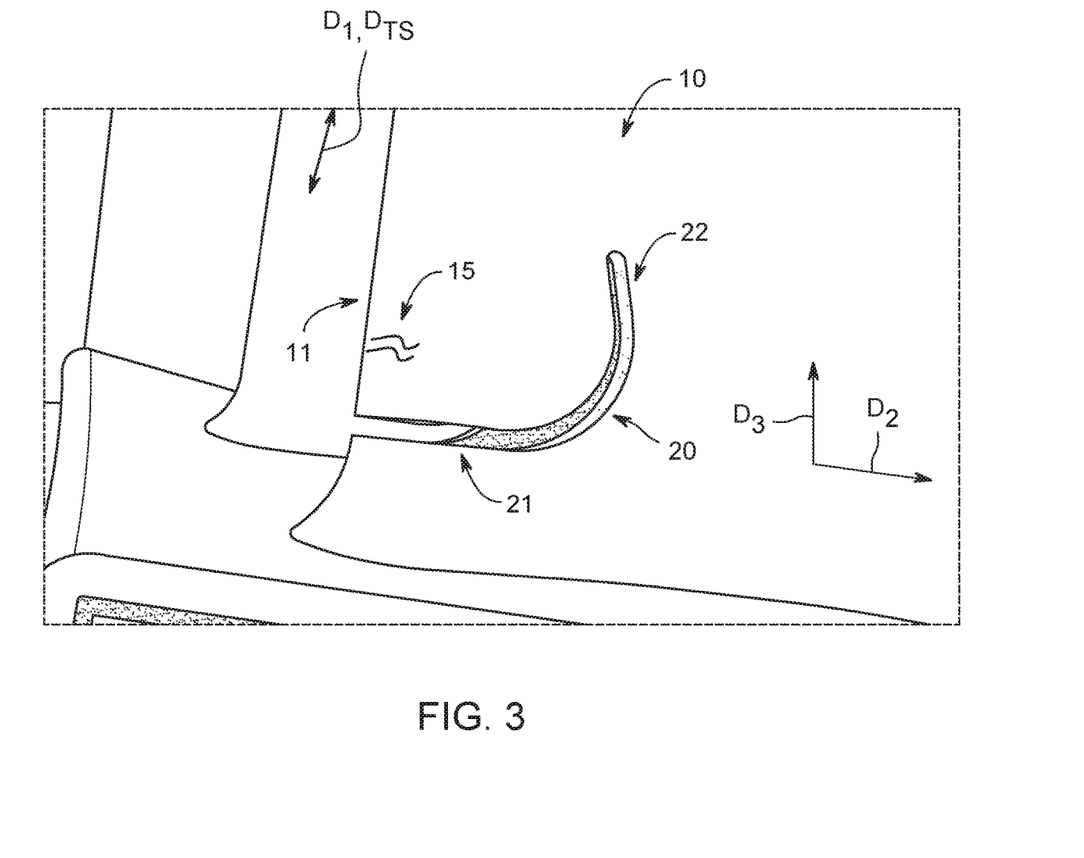
FIG. 3 is a component with a relief cut according to one or more embodiments shown or described herein.
Figure 4:
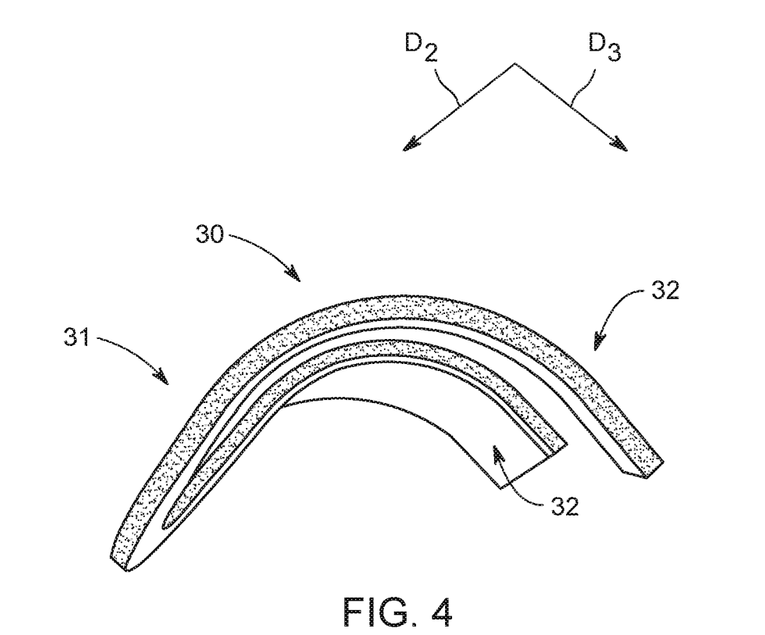
FIG. 4 is a supplemental filler for a component with a relief cut according to one or more embodiments shown or described herein.
Figure 5:
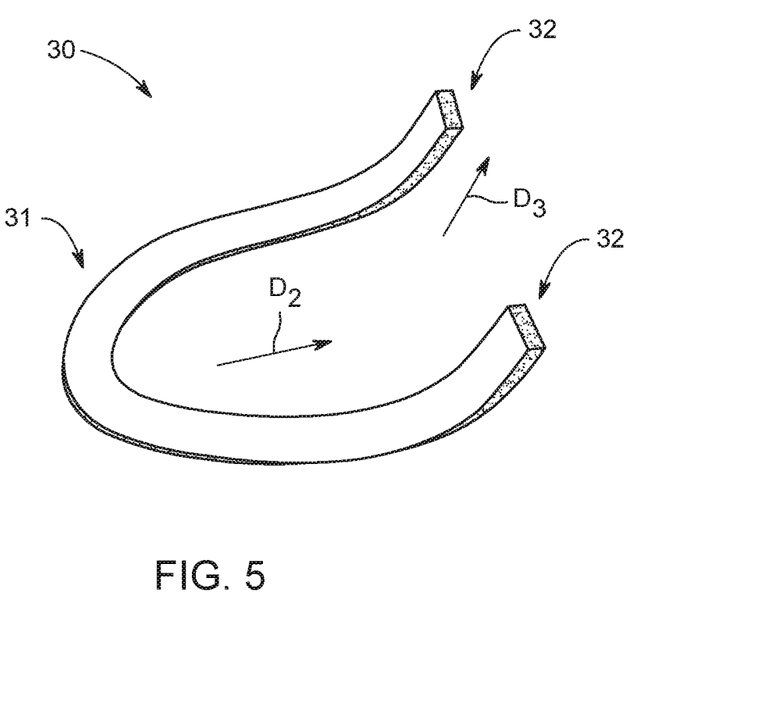
FIG. 5 is another view of the supplemental filler for a component with a relief cut according to one or more embodiments shown or described herein.
Figure 6:
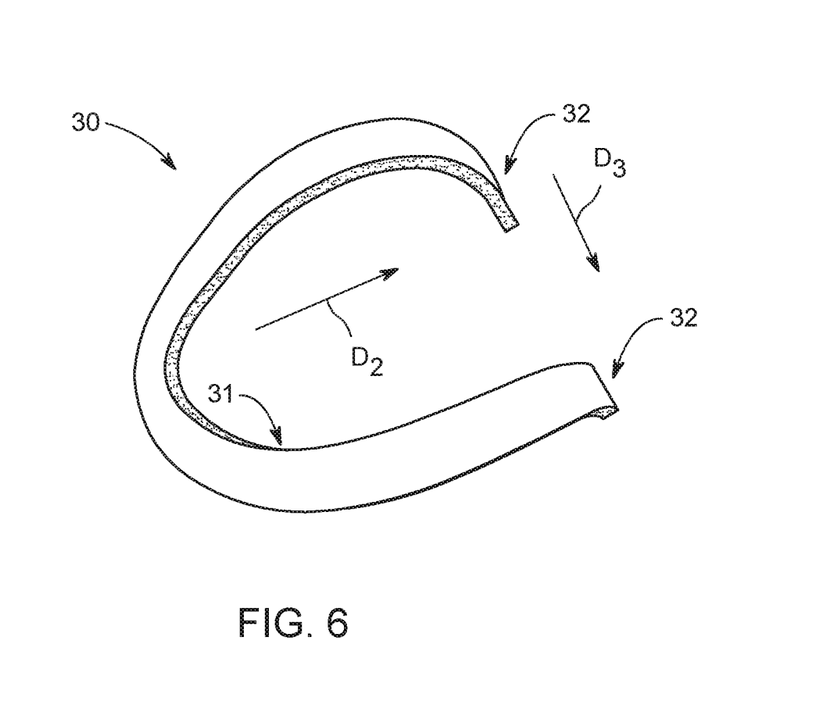
FIG. 6 is another view of the supplemental filler for a component with a relief cut according to one or more embodiments shown or described herein.
Figure 7:
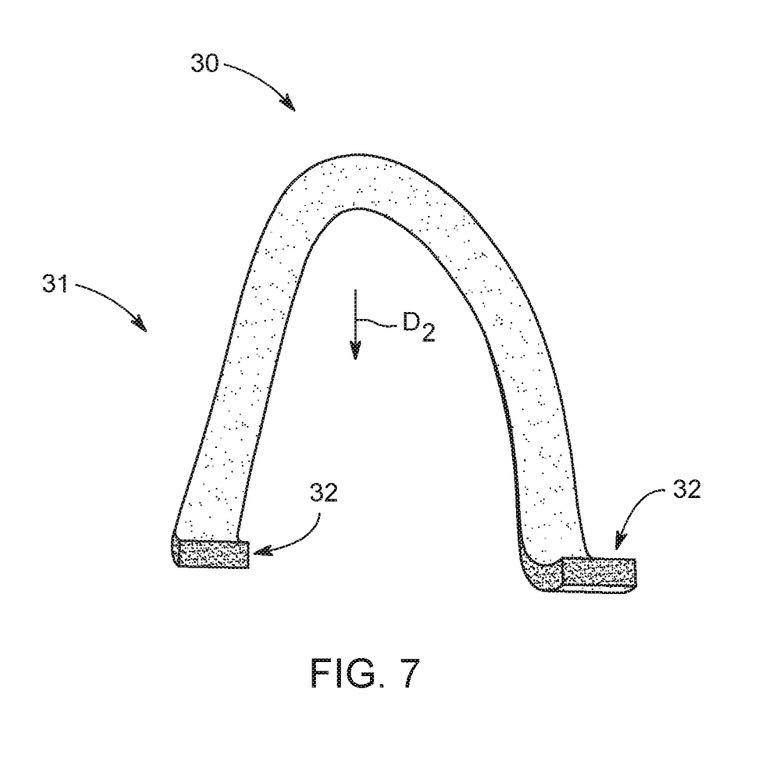
FIG. 7 is another view of the supplemental filler for a component with a relief cut according to one or more embodiments shown or described herein.
Figure 8:
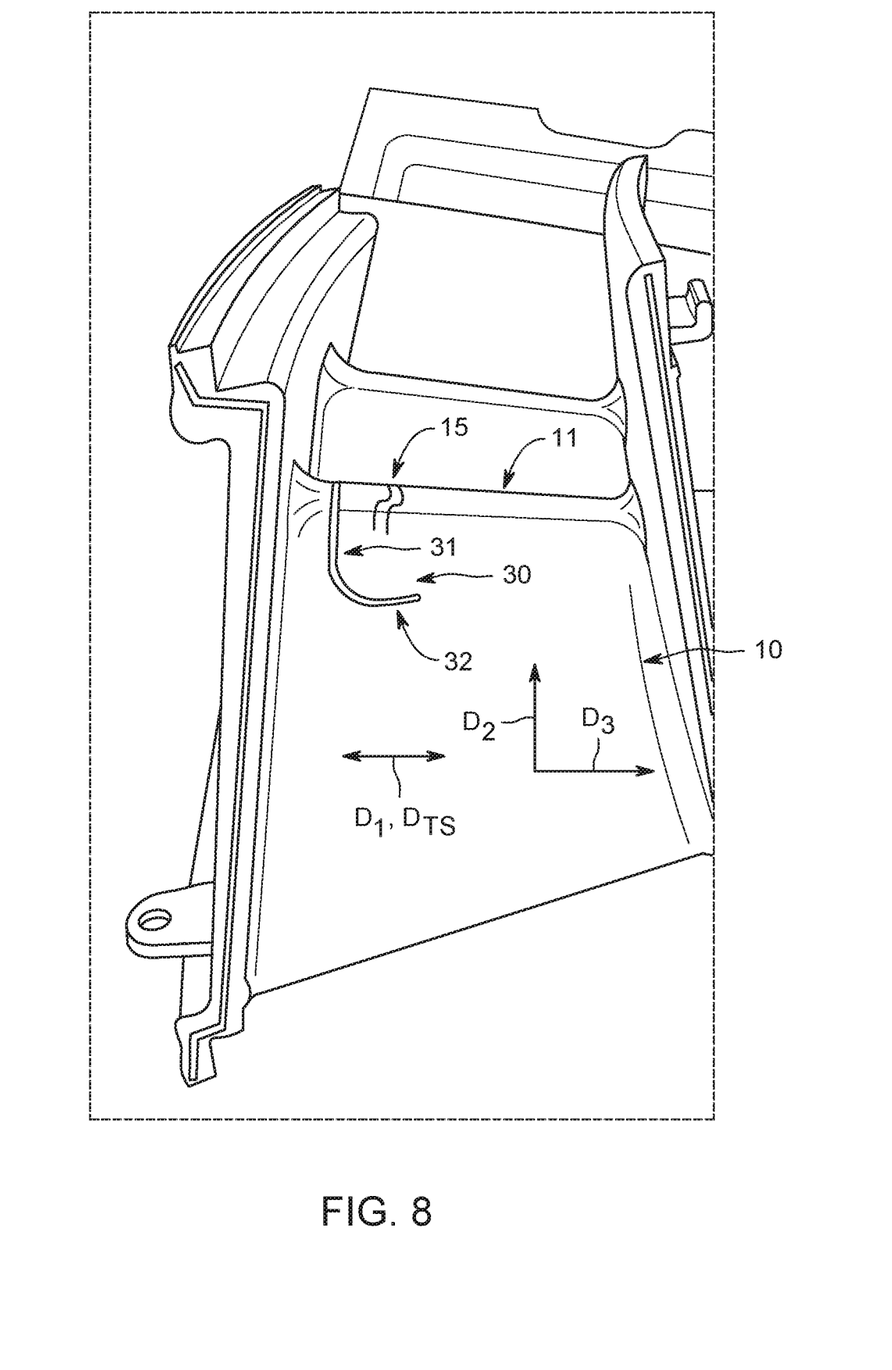
FIG. 8 is a modified component with a supplemental filler according to one or more embodiments shown or described herein; and, FIG. 9 is a method for modifying a component according to one or more embodiments shown or described herein.

Referring now additionally to FIG. 3, the modified component 10 may comprise any component of the turbomachine 100, or any other component 10 utilized in other applications that may comprise hard to weld alloys. For example, the modified component 10 can comprise a variety of types of components used in a variety of different applications, such as, for example, components utilized in high temperature applications (e.g., components comprising nickel, cobalt or iron based superalloys). In some embodiments, the modified component 10 may comprise an industrial gas turbine or steam turbine component such as a combustion component or hot gas path component. In some embodiments, the modified component 10 may comprise a turbine blade, compressor blade, vane, nozzle, shroud, rotor, transition piece or casing. In other embodiments, the modified component 10 may comprise any other component of a turbine such as any other component for a gas turbine, steam turbine or the like. In some embodiments, the modified component 10 may comprise a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

In some particular embodiments, the modified component 10 can comprise, for example, nickel-base, cobalt-base, or nickel-iron-base superalloys. Such alloys can contain about 50% or more by weight of nickel, cobalt or nickel-iron, plus alloying elements that are added to improve the mechanical and physical properties of these alloys. These materials may be used in a variety of fields that require good strength, creep resistance, oxidation resistance, fracture toughness, and/or other mechanical properties at elevated temperatures for extended periods of time.

For example, in some embodiments, the modified component 10 can comprise at least one of a nickel based super alloy, a cobalt based super alloy, an iron based super alloy, and/or Rene 108. In various examples, such materials may include nickel based superalloys such as Rene N4™, Rene N5™, Rene 108™, GTD-111®, GTD-222®, GTD-444® and IN-738. Rene N4™, Rene N5™, Rene 108™, GTD-111®, GTD-222® and GTD-444® comprise gamma prime-strengthened nickel-based superalloys whose compositions are reported in various literature, including U.S. Pat. Nos. 4,810,467, 5,154,884, 5,399,313, 6,074,602, 6,416,596, 6,428,637, and others. The nominal composition of IN-738 is reported as, by weight, about 16% chromium, 8.5% cobalt, 1.75% molybdenum, 2.6% tungsten, 1.75% tantalum, 0.9% niobium, 3.4% aluminum, 3.4% titanium, 0.10% zirconium, 0.01% boron, 0.17% carbon, the balance nickel and impurities. In some embodiments, the superalloy component can comprise cobalt-base superalloys such as FSX-414. The nominal composition of FSX-414 is, by weight, about 29.5% chromium, 10.5% nickel, 7% tungsten, up to 2% iron, 0.25% carbon, and 0.012% boron, the balance cobalt and incidental impurities. While certain alloys and compositions have been presented herein for the modified component 10, it should be appreciated that these are exemplary only and not intended to be limiting.

The modified component 10 may further comprise an edge 11 as illustrated in FIGS. 3-8 that extends in a first direction $D_1$. The edge 11 may comprise any edge such as a leading edge for a nozzle or turbine blade. The modified component 10 may experience a tensile stress in a tensile stress direction $D_{TS}$. The tensile stress direction $D_{TS}$ may, for example, run in a direction that is similar to or even substantially parallel with the first direction $D_1$ of the edge 11. Due to one or more environmental or operational factors imposed on the component, it may experience one or more cracks 15 or wear features along the edge 11 that extend into the component. These cracks 15 may potentially continue to grow if the tensile stress is not relieved away from the area such as by using the relief cut 20 and supplemental filler 30 as disclosed herein For example, referring now also to FIG. 3, a relief cut 20 can be formed in the modified component 10 to relieve and redirect stress (e.g., tensile stress) away from and/or around potential cracks 15 in the edge 11 of the modified component 10. The relief cut 20 can comprise at least a first section 21 and a second section 22. The first section 21 of the relief cut 20 can extend from the edge 11 (which extends in the first direction $D_1$) into the modified component 10 in a second direction $D_2$. The second section 22 of the relief cut 20 can further extend from the first section 21 in a third direction $D_3$.

The second direction $D_2$ and third direction $D_3$ may be formed such that stresses experienced by the modified component 10 proximate potential cracks 15 (e.g., tensile stress in a tensile stress direction $D_{TS}$ parallel to the first direction $D_1$ of the edge 11) are redirected to another portion of the modified component 10. For example, the second direction $D_2$ of the first section 21 of the relief cut 20 may comprise any direction into the modified component 10 such as one substantially orthogonal to the first direction $D_1$. In some embodiments, the third direction $D_3$ of the second section 22 of the relief cut 20 may be substantially parallel to the first direction $D_1$ such as when the tensile stress direction $D_{TS}$ is the same or substantially similar to the first direction $D_1$.

The relief cut 20 may be formed via a variety of methods. For example, in some embodiments, the relief cut 20 may be formed via plunge EDM (electrical discharge machining). In some embodiments, the relief cut 20 may be formed via laser. In some embodiments, the relief cut 20 may be formed via water jet. In some embodiments, the relief cut 20 may be formed via cutting (e.g., saws, blades or the like).

Referring now additionally to FIGS. 4-8, the relief cut 20 may be filled in by a supplemental filler 30. The supplemental filler 30 may comprise any material such as one that can bond or join to the original material of the modified component 10.

In some embodiments, the supplemental filler 30 may form a hermetic seal with the modified component 10. Such embodiments may help prevent or limit air ingestion by the modified component 10 such as when it comprises a nozzle or blade in a turbomachine 100. In some embodiments, the supplemental filler 30 may comprise a braze material and/or a weld material. In some embodiments, the supplemental filler 30 may comprise a softer material or a material with a lower melting temperature than the material of the rest of the modified component 10 (e.g., the original base material). In some embodiments, the supplemental filler 30 may comprise GTD 262 and/or GTD 263. While certain materials have been presented herein for the supplemental filler 30, it should be appreciated that these are exemplary only and not intended to be limiting.

With particular reference to FIGS. 4-7, in some embodiments the supplemental filler 30 may comprise a coupon. The coupon can comprise any pre-formed material that can slide into the relief cut 20 of the modified component 10. The coupon may comprise a single unitary piece, or may comprise a plurality of pieces (e.g., two, three or more) that may combine to form a shape that substantially fills the relief cut 20. For example, the coupon may comprise separate pieces that are brazed together within the modified component 10. Furthermore, in embodiments where the supplemental filler 30 comprises a coupon, the coupon may be joined, connected or otherwise secured to the modified component via any suitable means. Such materials of supplemental filler may include brazing and/or welding materials and more particularly may include materials such as, but not limited to, brazing material, welding material, adhesives, bolts, screws or the like.

The supplemental filler 30 may comprise a shape that substantially conforms to the relief cut 20 such that it helps fill the open slot. For example, the supplemental filler 30 can comprise at least a first portion 31 and a second portion 32. The first portion 31 of the supplemental filler 30 can extend from the edge 11 (which extends in the first direction $D_1$) into the modified component 10 in a second direction $D_2$. The second portion 32 of the supplemental filler 30 can further extend from the first portion 31 in a third direction $D_3$.

The second direction $D_2$ and third direction $D_3$ may be formed such that stresses experienced by the modified component 10 proximate potential cracks 15 (e.g., tensile stress in a tensile stress direction $D_{TS}$ parallel to the first direction $D_1$ of the edge 11) are redirected to another portion of the modified component 10. For example, the second direction $D_2$ of the first portion 31 of the supplemental filler 30 may comprise any direction into the modified component 10 such as one substantially orthogonal to the first direction $D_1$. In some embodiments, the third direction $D_3$ of the second portion 32 of the supplemental filler 30 may be substantially parallel to the first direction $D_1$ such as when the tensile stress direction $D_{TS}$ is the same or substantially similar to the first direction $D_1$.

Figure 9:
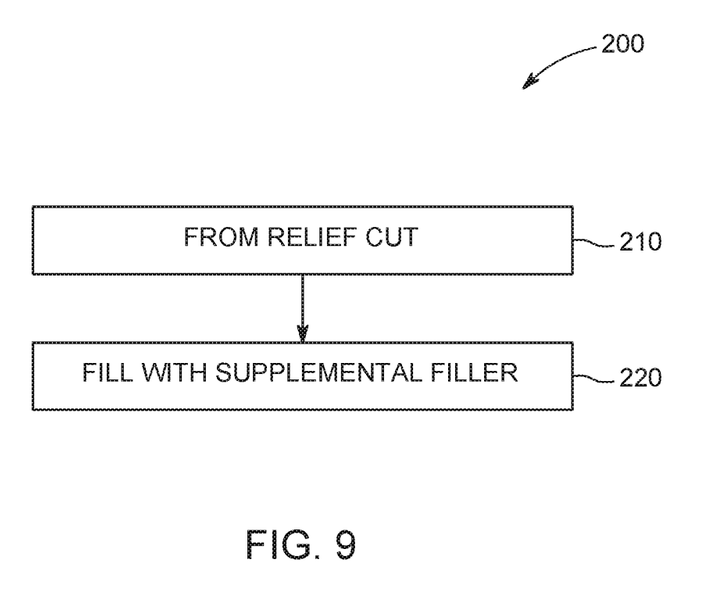

Referring now additionally to FIG. 9, a method 200 is illustrated for modifying a component 10 comprising an edge 11 extending in a first direction $D_1$ (such that it may produce the modified component 10 as may be disclosed, described or illustrated herein). The method 200 may first comprise forming a relief cut 20 in the modified component 10 in step 210. As discussed above, the relief cut 20 can comprise a first section 21 and a second section 22, wherein the first section 21 of the relief cut 20 extends from the edge 11 into the modified component 10 in a second direction $D_2$, and wherein the second section 22 of the relief cut 20 extends from the first section 21 in a third direction $D_3$. The method 200 may further comprise filling in the relief cut 20 with a supplemental filler 30 in step 220. The supplemental filler 30 may comprise any material(s) and configuration(s) as described herein.

It should now be appreciated that modified components and methods for modifying components can utilize the relief cuts and supplemental fillers disclosed herein to help redirect stress away from a particular area (e.g., an area comprising one or more cracks). The relief cut may be filled in at least to hermetically reseal the modified component to prevent air ingestion. By utilizing the relief cut in the modified component to redirect stresses, damaged or cracked areas may still be left in the component while still ensuring the integrity of the modified component and while also accounting for weld restraints for some hard to weld alloys While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A component comprising:
   a body having a first material composition, and including an edge extending in a first direction;
   a crack within the body, and extending inwardly to a first depth from the edge in a second direction orthogonal to the first direction; and
   a filler disposed in the body of the component within the edge at a location distal to the crack, the filler including:
      an arcuate portion having an apex at the edge of the body, and a pair of arc lengths each extending in the second direction from the edge into the component to an opposing end at a second depth greater than the first depth, the arcuate portion being distal to the crack along the edge and
      a pair of transverse portions each extending within the body from a respective one of the pair of arc lengths in a third direction in parallel with the first direction, wherein a portion of the body is between the pair of transverse portions,
      wherein the crack within the body is aligned with, and distal to, the portion of the body between the pair of transverse portions of the filler.

2. The component of claim 1, wherein the third direction is parallel to the first direction.

3. The component of claim 1, wherein the component is subjected to and experiences a tensile stress in a tensile stress direction parallel with the first direction.

4. The component of claim 1, the filler comprising a coupon.

5. The component of claim 4, the coupon comprising a plurality of separate pieces, wherein the plurality of separate pieces are brazed or welded together to form the coupon in the component.

6. The component of claim 1, the filler comprising at least one of a braze or a weld material, or the filler forms a hermetic seal with the component.

7. The component of claim 1, the filler comprising at least one of GTD 262 or GTD 263.

8. The component of claim 1, the component comprising at least one of a nickel based super alloy, a cobalt based super alloy, an iron based super alloy, or Rene 108.

9. The component of claim 1, wherein the component comprises a turbomachine component, and wherein, the edge comprises a leading edge of a turbomachine nozzle.

10. A component comprising:
    a body having a first material composition, and including an edge extending in a first direction;
    a crack within the body, and extending inwardly to a first depth from the edge in a second direction orthogonal to the first direction;
    a relief cut within the body at a location distal to the crack, wherein the relief cut includes:
       an arcuate portion having an apex at the edge of the body, and a pair of arc lengths each extending in the second direction in opposite directions from the edge into the component to an opposing end at a second depth greater than the first depth, the arcuate portion being distal to the crack along the edge
       a pair of transverse portions each extending within the body from a respective arc length of the arcuate portion in a third direction in parallel with the first direction, wherein a portion of the body is between the pair of transverse portions, and a filler disposed in the relief cut, wherein the crack within the body is aligned with, and distal to, the portion of the body between the pair of transverse portions of the filler.

11. The component of claim 10, the filler comprising a coupon.

12. The component of claim 11, the coupon comprising a plurality of separate pieces, wherein the plurality of separate pieces are brazed or welded together to form the coupon in the component.

13. The component of claim 10, the filler comprising at least one of a braze or a weld material, or the filler forms a hermetic seal with the body of the component.

14. The component of claim 10, the filler comprising at least one of GTD 262 or GTD 263.

15. The component of claim 10, the component comprising at least one of a nickel based super alloy, a cobalt based super alloy, an iron based super alloy, or Rene 108.

16. The component of claim 10, wherein the component comprises a turbomachine component, and wherein, the edge comprises a leading edge of a turbomachine nozzle.

17. The component of claim 10, wherein the component is subjected to and experiences a tensile stress in a tensile stress direction similar to or parallel with the first direction.

18. The component of claim 10, wherein the third direction is parallel to the first direction.

19. The component of claim 10, wherein the component includes a blade structure of a turbomachine.

* * * * *